Figure 1:
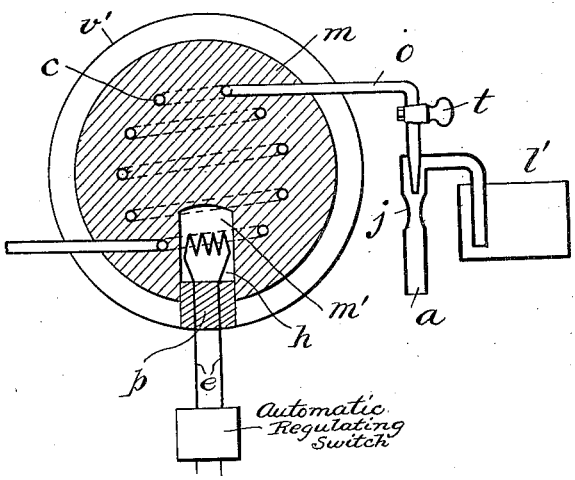

G. G. BELL & J. ST. V. PLETTS.
METHOD OF PRODUCING HOT WATER BY MEANS OF ELECTRICITY AND APPARATUS THEREFOR.
APPLICATION FILED JAN. 23, 1911.

1,069,374.

Patented Aug. 5, 1913.

3 SHEETS—SHEET 1.

Witnesses

Inventors
George Gilbert Bell
John St Vincent Pletts
By Henry Orth Jr.
Attorney

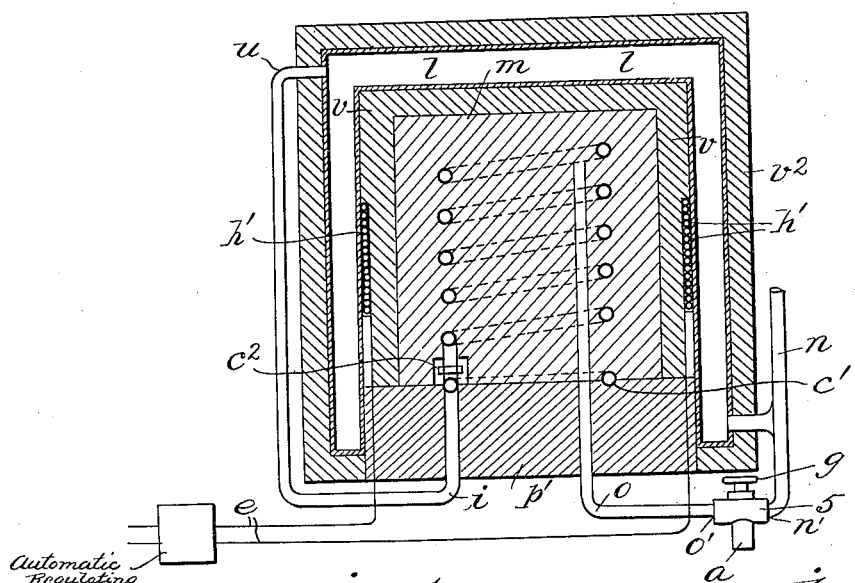
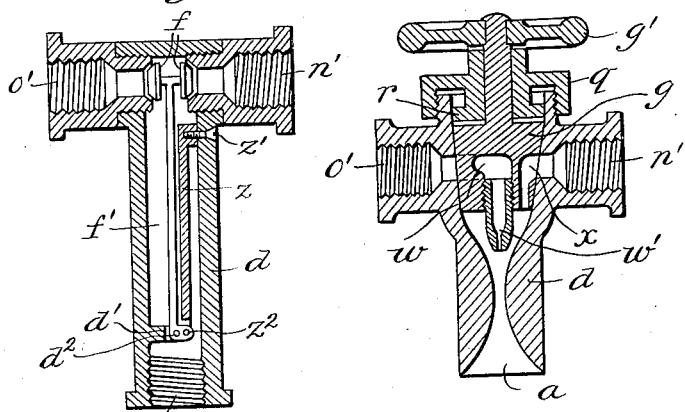
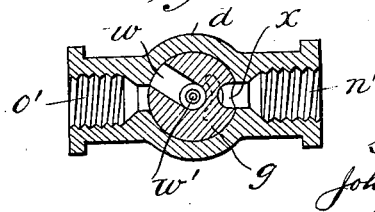

G. G. BELL & J. ST. V. PLETTS.
METHOD OF PRODUCING HOT WATER BY MEANS OF ELECTRICITY AND APPARATUS THEREFOR.
APPLICATION FILED JAN. 23, 1911.
1,069,374.
Patented Aug. 5, 1913.
3 SHEETS—SHEET 3.
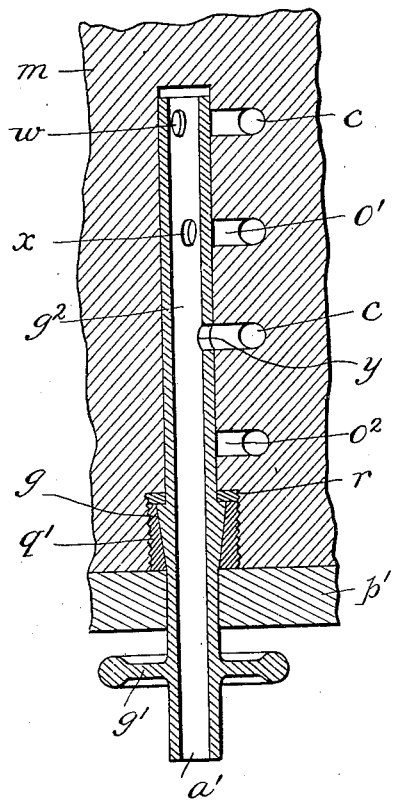
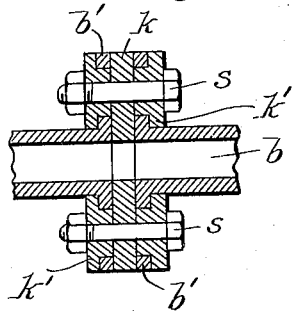
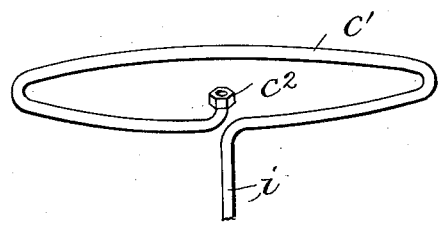
Witnesses
Inventors
George Gilbert Bell
John St Vincent Pletts
By Henry Orth Jr.
Attorney

UNITED STATES PATENT OFFICE.

GEORGE GILBERT BELL, OF LONDON, AND JOHN ST. VINCENT PLETTS, OF TEDDINGTON, ENGLAND, ASSIGNORS, BY MESNE ASSIGNMENTS, TO ELECTRIC HEAT STORAGE COMPANY, A CORPORATION OF NEW YORK.

METHOD OF PRODUCING HOT WATER BY MEANS OF ELECTRICITY AND APPARATUS THEREFOR.

1,069,374.   Specification of Letters Patent.   Patented Aug. 5, 1913.

Original application filed September 25, 1909, Serial No. 519,558. Divided and this application filed January 23, 1911. Serial No. 604,097.

*To all whom it may concern:*

Be it known that we, GEORGE GILBERT BELL and JOHN ST. VINCENT PLETTS, subjects of the King of Great Britain, residing, respectively, at 14 Addison Court Gardens, London, England, and 43 Clarence road, Teddington, in the county of Middlesex, England, have invented certain new and useful Improvements in Methods of Producing Hot Water by Means of Electricity and Apparatus Therefor; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification, which is a division of our application, Serial No. 519,558, filed September 25, 1909.

This invention relates to a new or improved method of heating by electricity and apparatus therefor.

The usual method of heating water electrically consists in placing the quantity of water required to be heated in an electrically heated vessel, which may or may not be provided with a heat insulating coating. Such a method, however, is only capable of heating a predetermined quantity of water and requires a certain time to produce the temperature required while it makes a large and brief demand upon the electric supply, but this invention is characterized by electrically heating a heat accumulator or mass of a substance capable of storing heat and in imparting that stored heat to water as and when required.

Moreover, according to this invention, it is possible to consume the electrical energy either continuously or during those hours of the day when it may be purchased most cheaply for the purpose of storing up a considerable amount of heat ("considerable amount of heat" representing the accumulation produced by the application of a smaller amount of electric energy for a period of time) and to deliver the hot water whenever required in any quantities up to a maximum depending on the size of the apparatus. The latter consists in its simplest form of a heat accumulator or mass of a substance capable of withstanding a high temperature having a high specific or latent heat value and it should be a good conductor of heat so as to impart its heat quickly to the water. Iron, for example, is a suitable material to employ and a mass of iron is provided with a duct or coil of pipe embedded therein or passing through same for the passage of the water, and an electric heating device, both the coil and the heater being surrounded by a heat insulating coating or jacket. The mass being heated, transmits heat to the pipe coil and thus heats the water in or passing through same and means may be provided for mixing the steam or hot water with cold water to give the temperature required. The mass of iron may have any shape, but it is desirable that it should have the least possible surface for its volume in order that the escape of heat may be a minimum, and it is therefore preferable to cast a sphere of iron about a coil of pipe, through which passes the water to be heated. The coil of pipe may be of any length and may be arranged so that there is an equal volume of iron within and without the convolutions and the piping may be of any section or may be corrugated in order to give a large surface so that the heat may be imparted sufficiently quickly to the water passing through it.

The heat may be produced by passing the electric current through a resistance of any kind as in the case of an alternating current by the hysteresis of a core around which the current passes or by the passage of a secondary induced current through a circuit of any form or by any combination of these methods and the heating device of the apparatus may be within or without the mass of iron or the mass of iron may itself form part of the heating device. In the case of an alternating current with a secondary heat producing circuit the primary circuit may be separated from the mass of iron by a layer of heat insulating material or may be entirely outside the insulating coating so that it conducts away as little heat as possible from the mass of iron.

The insulating coating surrounding the mass of iron and the heating device may be made of any substance which is a good heat insulator, and of any thickness, and it may, if desirable for strength or otherwise, have an external or internal metal sheathing, or it may consist of a double sheathing with a vacuum between the walls and the external and internal surfaces of the sheathings may be polished or silvered to minimize radiation.

The steam or hot water produced by the passage of the water through the hot mass of iron may be mixed with cold water either by employing a thermostatic valve or cock which causes the water to issue at a practically constant temperature, or by employing an injector or mixing nozzle which picks up sufficient water to condense the steam, or by employing a hand regulated valve or cock by means of which the temperature of the water can be varied as desired and in the latter case means may be provided for preventing the escape of uncondensed steam and the consequent loss of latent heat by employing for example an automatic float valve which prevents the passage of steam. The temperature of the steam or hot water issuing from the hot mass of iron may also be regulated by providing a valve or cock connected to the coil of pipe at several points in such a manner that the water may be drawn from any of such points thus regulating the temperature to which the water is raised by varying the length of the duct or pipe through which it passes.

It is evident, since there is no material which is a perfect heat insulator, that a certain amount of heat must escape from the hot mass of iron and the latter is therefore preferably placed together with its insulating coating within a tank from which the cold water to be converted into steam or hot water or to be mixed with the steam or hot water is drawn so that the heat escaping is not lost this tank may also be provided with a heat insulating coating. Further the electrical and water connections may be constructed to have a considerable length within the tank so that what heat they conduct away from the mass of iron is given up to the water and is not lost, and the water pipes may be made of a material which is not a good conductor of heat, or may have insulating washers inserted at one or more places in them to break the metallic connection.

The current used in this apparatus for heating may be obtained from a source on which the demand is variable, and when the demand is at its maximum and can take all the supply, the current to the heating apparatus of this invention is adapted to be cut off by any known form of automatic switch.

We now proceed to describe in greater detail apparatus for carrying out our invention with particular reference to the figures.

Figure 2:
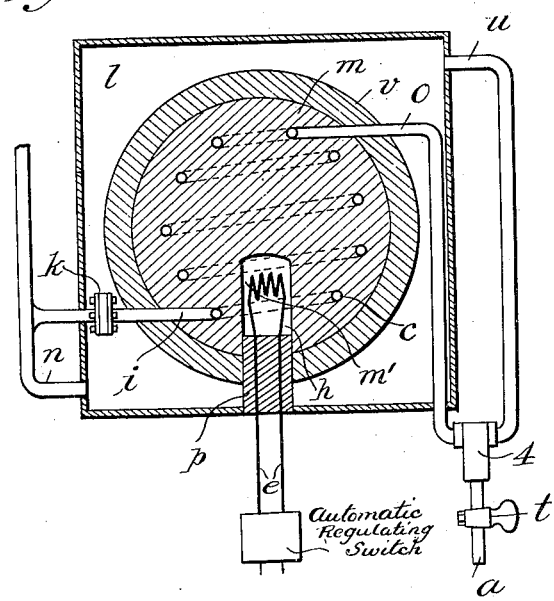

Figures 1, 2 and 3 are sections of different forms of the apparatus. Fig. 4 is a section of a thermostatic valve; Fig. 5 is a section of a hand regulated cock; Fig. 6 is another section of the cock shown in Fig. 5; Fig. 7 is a section of another form of hand regulated cock; Fig. 8 is a perspective view of the removable section of the coil shown in Fig. 3; and Fig. 9 is a section of the insulating washer shown in Fig. 2.

In Figs. 1, 2 and 3, $m$ is the mass of iron cast about the coil of pipe $c$ which is provided with the inlet $i$ and outlet $o$.

In Figs. 1 and 2 the heat accumulator or mass of iron $m$ is provided with a recess $m^1$ containing the heater $h$ connected to the electric mains $e$ which pass out through the plug of insulating material $p$ which can be removed so that the heater $h$ may be removed and replaced.

In Fig. 1 the heat accumulator or mass of iron $m$ is placed within a vessel $v^1$ from which the air is exhausted and the outlet pipe $o$ of the coil $c$ is provided with a cock $t$ and injector $j$ which, if air is issuing from the pipe $o$, picks up sufficient water from the tank $l^1$ to condense the steam and deliver hot water at the orifice $a$.

In Fig. 2 the heat accumulator or mass of iron $m$, together with its coating of insulating material $v$ and heater $h$, is placed within a tank $l$ through which pass the inlet pipe $i$ and the outlet pipe $o$ and in which is an aperture for the insertion of the plug $p$ with the electric mains $e$. The tank $l$ is also provided with an inlet pipe $n$ and an outlet pipe $u$ which latter connects with the outlet pipe $o$ of the coil $c$ at the thermostatic valve 4 and has a common outlet through the cock $t$ and orifice $a$ so that when the cock $t$ is turned on, water will flow both through the mass of iron $m$ and tank $l$ and be mixed at the valve 4 in such proportions that it will issue from the orifice $a$ at a substantially constant temperature.

In Fig. 3 the heat accumulator or mass of iron $m$ for simplicity of construction is made cylindrical instead of spherical and in place of the heater $h$ of the former figures a coil of wire $h^1$ is wound around outside of the insulating coating $v$, thus forming a primary circuit which, with an alternating current, will induce secondary currents and produce heat in the mass of iron $m$. The pre-heating tank $l$ which is provided with an insulating coating $v^2$ is made with a large cylindrical recess into which fits the mass of iron $m$ together with its insulating coating $v$ and primary coil $h^1$, the recess being closed by a plug of insulating material $p^1$ through which pass the inlet pipe $i$, the outlet pipe $o$ and the electric mains $e$, but the inlet pipe $i$, after it has passed through the plug of insulating material $p^1$ and before it enters the mass of iron $m$, makes one turn $c^1$ in contact with the mass of iron $m$ so that this external turn $c^1$ in which the fur will be formed, if the water is hard, can be easily replaced. The outlet pipe $u$ of the tank $l$ is joined to the inlet pipe $i$ of the coil $c$ forming a duct or heat delivering chamber, and the inlet pipe $n$ of the tank $l$ connects with the outlet pipe $o$ of the coil $c$ at the hand regulated cock 5 and has a common outlet through the orifice $a$ so that the temperature of the water issuing from the orifice $a$ can be regulated by turning the cock 5 which varies the proportion of water coming directly from the inlet pipe $n$ and indirectly through the tank $l$, pipes $u$ and $i$, coil $c$ and outlet pipe $o$. Thus the water in the coil $c$ is taken from the tank $l$ wherein it has been pre-heated. The tank $l$ therefore acts as a pre-heating tank or pre-heater.

In Fig. 4, which is a section on a larger scale, of the thermostatic valve shown in Fig. 2, $o^1$ is the inlet for the steam or hot water issuing from the coil of pipe, $n^1$ is the inlet for the colder water and both inlets are partially closed by the valves which are carried on the rod $f^1$. The inlets $o^1$ and $n^1$ screw into the barrel $d$ which is provided with a projection $d^1$ and is threaded at $t^1$ for attachment to a cock. A rod of metal $z$, having a smaller co-efficient of expansion under the action of heat than the metal of the barrel $d$, is fixed to the latter as by the screw $z^1$ and the valve rod $f^1$ is pivoted to the barrel projection $d^1$ at $d^2$ and pivotally connected to the metal rod $z$ at $z^2$ so that if the water passing through the outlet duct or barrel $d$ increases in temperature it will cause the barrel $d$ to expand more than the rod $z$, thus moving the valve rod $f^1$ and valves $f$ about the pivot $d^2$ in the direction which closes the inlet $o^1$ and opens the inlet $n^1$. If the temperature of the water decreases, the action is the reverse, with the result that the water issuing at $t^1$ will be maintained at a practically constant temperature.

In Fig. 5, which is a section on a larger scale, of the hand regulated valve shown in Fig. 3, $o^1$ is the inlet for the steam or hot water issuing from the coil of pipe, $n^1$ is the inlet for the colder water and $a$ is the common outlet. A tapered plug $g$ having passages $w$ and $x$ fits into the top part of the barrel $d$ and is held in place by the screwed cover $q$ and made water tight by the washer $r$. The plug $g$ is also fitted with a handle $g^1$ and nipple $w^1$ which, projecting into the constricted portion of the barrel $d$, insures the proper mixing of the steam or hot water coming through the inlet $o^1$ and passage $w$, with the colder water coming through the inlet $n^1$ and passage $x$. The use of the hand valve, Fig. 5, or the thermostatic valve, Fig. 4, involves the periodic or intermittent withdrawal of hot water from $c$, either as such or in the form of steam and the corresponding periodic or intermittent withdrawal of heat from the accumulator $m$, it being the elementary idea of an accumulator that it affords a store or stock to be drawn upon from time to time as desired. This feature is referred to in the claims by the term "periodically." The same is true of the application of heat to the accumulator, it being also an elementary idea that the accumulator stores up small or irregular amounts of heat, such heat being produced by the conversion into heat of electric energy applied at such irregular times as may be permitted by the other demands for current, such as for lighting and power. The accumulator thus performs its functions as a storage medium.

In Fig. 6 it is seen that the passages $w$ and $x$ in the plug $g$ are so arranged that as the plug $g$ is turned the passage $x$ first opens to the inlet $n^1$ and then as this closes, the passage $w$ opens to the inlet $o^1$ until when the latter is wide open the former is just closed thus enabling the steam or hot water to be mixed with the colder water in any proportion required.

In Fig. 7, $m$ is the heat accumulator or mass of iron and $c$ the coil of pipe, each convolution of which is connected by a short passage $o^2$ to a hole drilled in the mass of iron $m$ and fitted with a hollow or tubular plug $g^2$. The gland $q^1$ screwing into the mass of iron $m$ holds the hollow plug $g^2$ in position by means of its tapered surface $g$ and makes a watertight joint by means of the washer $r$. The hollow plug $g^2$ which projects through the insulating coating $p^1$ and has a handle $g^1$ is also provided with holes $w$, $x$ and $y$ so arranged that any of the convolutions $c$ can be connected by its passage $o^2$ with the hollow plug $g^2$, thus enabling the temperature of the water issuing at $a^1$ to be varied by varying the length of the path through the mass of iron $m$.

In Fig. 8 which is a perspective view on a larger scale, of the removable section of the coil shown in Fig. 3, $c^1$ is the detachable turn of the coil $c$ and $c^2$ is a union or coupling for connecting it to the coil.

In Fig. 9 which is a section on a larger scale, of the insulating washer shown at $k$ in Fig. 2, $b$ is the pipe provided with flanges $b^1$ which are separated by the insulating washer $k$. The joints between the flanges $b^1$ and the insulating washer $k$ are made watertight by means of the bolts $s$ which are fitted at each end with insulating collets $k^1$ so that there is no metallic connection between the bolts $s$ and flanges $b^1$ and the conduction of heat along the pipe $b$ is therefore greatly retarded.

It must be distinctly understood that though only certain combinations of heating devices, pipes and valves are illustrated, any combination of these devices may be employed and further, that any such apparatus may be used in combination with any known form of automatic electric switch for the purpose, for instance, of cutting off the current when the maximum demand is being made on the electric supply; for instance, an electro-magnetic switch, which automatically opens upon a predetermined voltage drop in the main circuit, may be employed.

In some of the following claims we refer to the material of the accumulator as having high latent heat value, which is to be taken in the sense of the capacity for storing a considerable amount of heat, whether such heat be "latent" or "specific," in the strict technical sense.

The present application is a divisional application of our application Serial Number 519,558, filed September 25, 1909, for method of producing hot water by means of electricity and apparatus therefor.

Having thus described our invention, what we claim as new and desire to secure by Letters Patent, is:

1. The method of heating water and of supplying the water at any desired temperature, which consists in electrically heating a relatively small amount of water to a high temperature, conserving the heat in excess of that required to heat said small amount of water and employing it to heat a large amount of water to a lower temperature, drawing off the heated water simultaneously from both sources in varying amounts from each as desired, and discharging the same from a common outlet, whereby water may be supplied at any desired temperature.

2. The method of heating water and of supplying the water at any desired temperature, which consists in electrically heating a relatively small amount of water to a high temperature, conserving the heat in excess of that required to heat said small amount of water and employing it to heat a large amount of water to a lower temperature, supplying the small amount of water to be heated to a high temperature from the larger amount of water of lower temperature, drawing off the heated water simultaneously from both the sources in varying amounts from each as desired, and discharging the same from a common outlet, whereby water may be supplied at any desired temperature.

3. A system for electrically heating water and supplying it at any desired temperature, comprising a central source of electricity, an electric heater supplied with electricity from said source, to heat a relatively small amount of water to a high temperature, conserving the heat in excess of that required to heat said small amount of water in a heat accumulator, means to contain a large amount of water heated by said accumulator to a lower temperature, and means to simultaneously draw off the heated water from both sources in varying amounts as desired, and discharge the same from a common outlet.

4. A system for electrically heating water and supplying it at any desired temperature, comprising a central source of electricity, an electric heater supplied with electricity from said source to heat a relatively small amount of water to a high temperature, a heat accumulator conserving the heat in excess of that required to heat said small amount of water, means to contain a large amount of water heated by the excess of heat amount of water heated by the excess of heat in the accumulator to a lower temperature, means to connect the large and small amounts of water, and means to draw off the heated water simultaneously from both amounts of water in varying quantities and discharge the same from a common outlet.

5. A system for electrically heating water and supplying it at any desired temperature, comprising a central source of electricity upon which there is a variable demand, an electric heater supplied with electricity from said source, means to cut off the electric supply to the heater when demand on the source is at its maximum, a heat accumulator heated by said heater and containing a small amount of water heated to a high temperature, means to contain a large amount of water heated to a lower temperature by the accumulator, and means to draw off the heated water simultaneously from both amounts of water in varying quantities and discharge the same from a common outlet.

6. A system for electrically heating water and supplying it at any desired temperature, comprising a central source of electricity upon which there is a variable demand, an electric heater supplied with electricity from said source, means to cut off the electric supply to the heater when the demand on the source is at a maximum, a heat accumulator heated by said heater and containing a small amount of water heated thereby to a high temperature, means to contain a large amount of water heated to a lower temperature by the accumulator, means to supply the smaller amount of water from the larger amount, and means to draw off the heated water simultaneously from both amounts of water in varying quantities and discharge the same from a common outlet.

7. In combination, an electric heater, a heat storage mass heated thereby, a small water heating coil in the storage mass near the electric heater adapted to be highly heated, a water tank surrounding the mass, means for supplying water from the tank to the coil and means for simultaneously discharging water from said tank and coil and for regulating the discharge.

8. In an electric heater for liquids, the combination with two receivers for the liquid to be heated both permanently connected to a source of supply, a heat accumulator for one receiver, an electric heater for said accumulator and a mixing cock communicating with both receivers.

9. In an electric heater for liquids, the combination with two receivers permanently connected in series to a source of supply, a heat accumulator acting directly on one receiver and indirectly on the other, an electric heater for said accumulator and a mixing cock communicating with both receivers.

10. In an electric heater for liquids, a receiver for the liquid to be heated, an insulating jacket for said receiver, a second insulated receiver of smaller capacity, means for electrically heating the two receivers to differing degrees of temperature and a mixing cock communicating with both receivers.

11. In an electric heater for liquids, the combination of an external heat-insulated receiver, a second receiver contained in the external one with intervening insulation and composed of a mass of heat storing material forming the wall of the receiving chamber, an electric heater applied to said heat-storing mass and a mixing cock communicating with both receivers.

12. In an electric heater for liquids, the combination of an external heat-insulated receiver permanently connected to a source of supply, a second receiver contained by and in communication with said external receiver and composed of a mass of heat-storing material with a receiving chamber, an electric heater applied to said mass and a mixing cock communicating with both receivers.

13. The method of heating a liquid and supplying it at any desired temperature which consists in electrically heating a relatively small quantity of the liquid to a high temperature, conserving the heat in excess of that required to heat such small quantity of liquid and employing it to heat a large quantity of the liquid to a lower temperature, drawing off the heated liquid simultaneously from both sources in varying amounts from each as desired and discharging the same from a common outlet, whereby the liquid may be supplied at any desired temperature.

14. The method of heating a fluid and supplying it at any desired temperature which consists in electrically heating a relatively small quantity of the fluid to a high temperature, conserving the heat in excess of that required to heat such small quantity of fluid and employing it to heat a large quantity of the fluid to a lower temperature, drawing off the heated fluid simultaneously from both sources in varying amounts from each as desired and discharging the same from a common outlet, whereby the fluid may be supplied at any desired temperature.

15. In combination an electric heater, a heat storage mass heated thereby, a small fluid heating coil in the storage mass near the electric heater adapted to be highly heated, a fluid tank surrounding the mass, means for supplying fluid from the tank to the coil and means for simultaneously discharging the fluid from the said tank and coil and for regulating the discharge.

16. In an electric heater for fluids the combination of two receivers of differing capacity, both receivers being permanently connected to a source of supply and communicating with each other in series, means for heating the two receivers unequally, and a mixing cock communicating with both receivers for withdrawing their contents jointly.

In testimony that we claim the foregoing as our invention, we have signed our names in presence of two subscribing witnesses.

GEORGE GILBERT BELL.
JOHN ST. VINCENT PLETTS.

Witnesses:
W. MORBEY;
C. P. LEDDON.